(12) United States Patent
Zavatone et al.

(10) Patent No.: US 9,098,294 B2
(45) Date of Patent: Aug. 4, 2015

(54) BUILDING BLOCK BASED GRAPHICAL USER INTERFACE DESIGN AND DEVELOPMENT SYSTEMS AND METHODS

(75) Inventors: Alex Zavatone, Irving, TX (US); Donald H. Relyea, Dallas, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 497 days.

(21) Appl. No.: 12/983,118

(22) Filed: Dec. 31, 2010

(65) Prior Publication Data

US 2012/0173567 A1   Jul. 5, 2012

(51) Int. Cl.
*G06F 3/048*   (2013.01)
*G06F 9/44*   (2006.01)
*G06F 17/30*   (2006.01)

(52) U.S. Cl.
CPC ............ *G06F 8/38* (2013.01); *G06F 17/30997* (2013.01)

(58) Field of Classification Search
CPC .............................. G06F 8/38; G06F 17/30997
USPC ................................ 707/769; 715/763, 764
See application file for complete search history.

(56) References Cited

U.S. PATENT DOCUMENTS

| | | | |
|---|---|---|---|
| 6,342,907 B1* | 1/2002 | Petty et al. | 715/762 |
| 2002/0191018 A1* | 12/2002 | Broussard | 345/746 |
| 2003/0005424 A1* | 1/2003 | Ansari et al. | 717/154 |
| 2004/0148586 A1* | 7/2004 | Gilboa | 717/108 |
| 2007/0094609 A1* | 4/2007 | Gilboa et al. | 715/762 |
| 2008/0163080 A1* | 7/2008 | Kooy et al. | 715/762 |
| 2008/0244424 A1* | 10/2008 | Fukuda et al. | 715/763 |
| 2011/0093800 A1* | 4/2011 | Gottwald et al. | 715/763 |

* cited by examiner

*Primary Examiner* — Jensen Hu

(57) ABSTRACT

An exemplary method includes a graphics export subsystem interfacing with a graphical user interface design subsystem to access data representative of a graphical user interface screen design, detecting a building block placeholder element in the graphical user interface screen design, accessing, from a repository of building block elements, data representative of a building block element associated with the building block placeholder element, and generating, based on the graphical user interface screen design and the building block element, computing code configured to be processed by a target computing device to render a graphical user interface screen in accordance with the graphical user interface screen design and the building block element. Corresponding methods and systems are also disclosed.

19 Claims, 13 Drawing Sheets

BUILDING BLOCK BASED GRAPHICAL USER INTERFACE DESIGN AND DEVELOPMENT SYSTEMS AND METHODS

BACKGROUND INFORMATION

Advances in computing technologies have led to a proliferation of computing devices in modern society. Myriad computing devices having various shapes, sizes, and capabilities have been made available to consumers. For example, consumers may choose from computing devices such as mobile phones, smart phones, tablet computers, e-reader devices, personal computers, media players, gaming devices, set-top-box ("STB") devices, digital video recorder ("DVR") devices, Global Positioning System ("GPS") devices, and other types of computing devices.

The proliferation of computing devices in modern society has challenged designers and developers of graphical user interfaces for the computing devices. For example, the competitive landscapes between manufacturers of computing devices, between providers of applications that run on computing devices, and between providers of services accessed through the computing devices have pushed designers and developers of graphical user interfaces to design and develop graphical user interfaces as efficiently as possible without sacrificing quality. In addition, computing devices of varying computing platforms have different requirements, style guides, and processes for rendering graphical user interfaces, each of which must be considered by designers and developers of graphical user interfaces.

Unfortunately, traditional processes and tools for design and development of graphical user interfaces have not kept pace with the demands placed upon the designers and developers of the graphical user interfaces, especially for designers and developers tasked with design and development of graphical user interfaces for various computing platforms that may have different requirements, style guides, and/or processes for rendering graphical user interfaces. To illustrate, in a traditional design and development process, a designer utilizes a graphical user interface design tool to design a screen layout of graphical elements to be included in a graphical user interface. Once the design is complete, the designer provides information about the screen layout of graphical elements to a developer who is responsible for producing computing code configured to be executed by a computing device to render a graphical user interface that includes the screen layout of graphical elements designed by the designer. Unfortunately, this process is typically time consuming, requires significant manual labor by the designer and the developer, and is fraught with opportunities for error. For instance, the developer typically has to use the information provided by the designer to manually produce computing code for the screen layout. The process must be repeated each time a modification is made to the screen layout.

These problems are exacerbated when a screen layout design is to be integrated into graphical user interfaces to be rendered by computing devices having different computing platforms. In such cases, the developer must manually produce computing code in different languages for the different computing platforms. This is especially time consuming and error prone when the different computing platforms render graphical user interfaces in accordance with different requirements, style guides, and/or processes. Such differences across computing platforms may force a designer and/or developer to spend additional time during design and/or development to ensure that a graphical user interface is appropriately customized for each computing platform. For example, a requirement or style guide for a particular computing platform may specify that a certain graphical element be displayed in a particular way that is different from the way that the graphical element is to be displayed by another computing platform. Such platform-specific requirements and/or style guides typically increase the amount of time and work required to design and develop a graphical user interface for different computing platforms.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
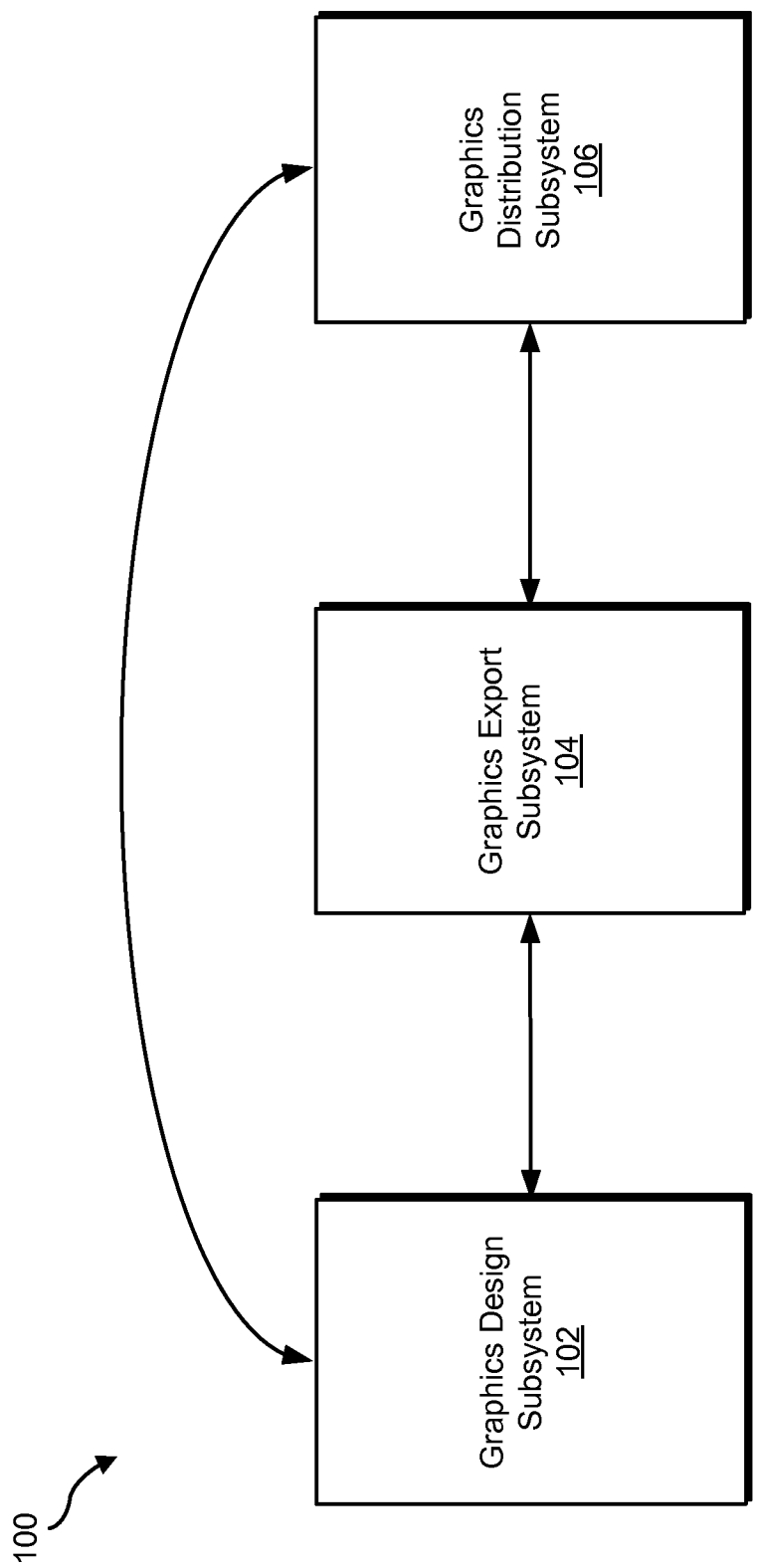
FIG. 1 illustrates an exemplary graphical user interface design and development system according to principles described herein.

Exemplary graphical user interface design and development systems and methods are described herein. The exemplary systems and methods may provide for automated, building block based design and development of a graphical user interface ("GUI") screen. Building block based design and development of a GUI screen may include creation and/or use of one or more building block elements in an automatic generation and export of computing code and/or graphical elements configured to be processed by target computing devices having different computing platforms to render GUI screens in accordance with a GUI screen design.

An exemplary method may include a graphics export subsystem interfacing with a graphical user interface design subsystem to access data representative of a GUI screen design, detecting a building block placeholder element in the GUI screen design, accessing, from a repository of building block elements, data representative of a predefined building block element associated with the building block placeholder element, and generating, based on the GUI screen design and the building block element, computing code and/or one or more graphical elements configured to be processed by a target computing device to render a GUI screen in accordance with the GUI screen design and the building block element. In some examples, the exemplary method may further include the graphics export subsystem similarly accessing and using one or more additional predefined building block elements to generate additional computing code and/or graphical elements configured to be processed by one or more additional target computing devices (e.g., computing devices having different computing platforms) to render one or more GUI screens in accordance with the GUI screen design and the one or more additional building block elements.

Another exemplary method may include a graphics export subsystem interfacing with a graphics design subsystem to access data representative of a building block graphical element design, automatically generating a building block element based on the building block graphical element design, and exporting the building block element for storage in a repository of building block elements. The exported building block element may be accessible by the graphics export subsystem for use in automatic generation of GUI screen computing code configured to be processed by a target computing device to render a GUI screen in accordance with a GUI screen design.

As used herein, the terms "predefined building block," "building block element," and variations thereof may be used interchangeably to refer to data representative of a set of building block computing code and/or one or more graphical elements that is configured to be processed by a target computing device to render at least part of a GUI screen and that is designated as being accessible and re-usable by the exemplary systems and methods described herein for automatic generation of GUI screen computing code and/or one or more graphical elements configured to be processed by a target computing device to render a GUI screen in accordance with a GUI screen design. Exemplary building block elements, as well as exemplary creation and use of building block elements, are described herein.

Building block based design and development of a GUI screen, as described herein, may facilitate an automated, efficient, and/or reliable process for design and development of a GUI screen. In some implementations, the timeline for design and development of a GUI screen may be reduced compared to typical timelines for design and development of a GUI screen in accordance with conventional GUI design and development processes. In addition, resources used to store data representative of computing code and/or graphical elements for a GUI screen may be conserved through the use of building block based design and development systems and methods at least because building block elements may be re-used, which may reduce the number of redundant graphical elements designed and stored for use in generating computing code for various GUI screens. These and other benefits and/or advantages of building block based design and development of a GUI screen will be made apparent by the following detailed description of exemplary GUI design and development systems and methods.

FIG. 1 illustrates an exemplary automated GUI design and development system 100 (or simply "system 100"). As shown in FIG. 1, system 100 may include a graphics design subsystem 102 (or simply "design subsystem 102"), a graphics export subsystem 104 (or simply "export subsystem 104"), and a graphics distribution subsystem 106 (or simply "distribution subsystem 106") configured to communicate or otherwise interface with one another as shown. Subsystems 102-106 may communicate and/or otherwise interface one with another using any suitable communication and/or interface technologies. Each of the elements of system 100 will now be described in detail.

Design subsystem 102 may include or be implemented by one or more design tools with which a designer may interact to define a building block element design and/or a GUI screen design. Design subsystem 102 may be configured to provide any suitable tools that may be utilized by a designer to define a building block element design and/or a GUI screen design. In certain implementations, the tools may include one or more commercially available or proprietary graphics design software applications, such as Adobe Illustrator, Adobe Photoshop, and/or any other suitable GUI screen design software application(s).

Design subsystem 102 may be configured to provide a user interface through which a designer may interact with design subsystem 102 to define a building block element design and/or a GUI screen design. The user interface may be configured to visually depict the building block element design and/or the GUI screen design such that the designer may interact with the visual depiction to define and/or modify the building block element design and/or the GUI screen design.

Figure 2:
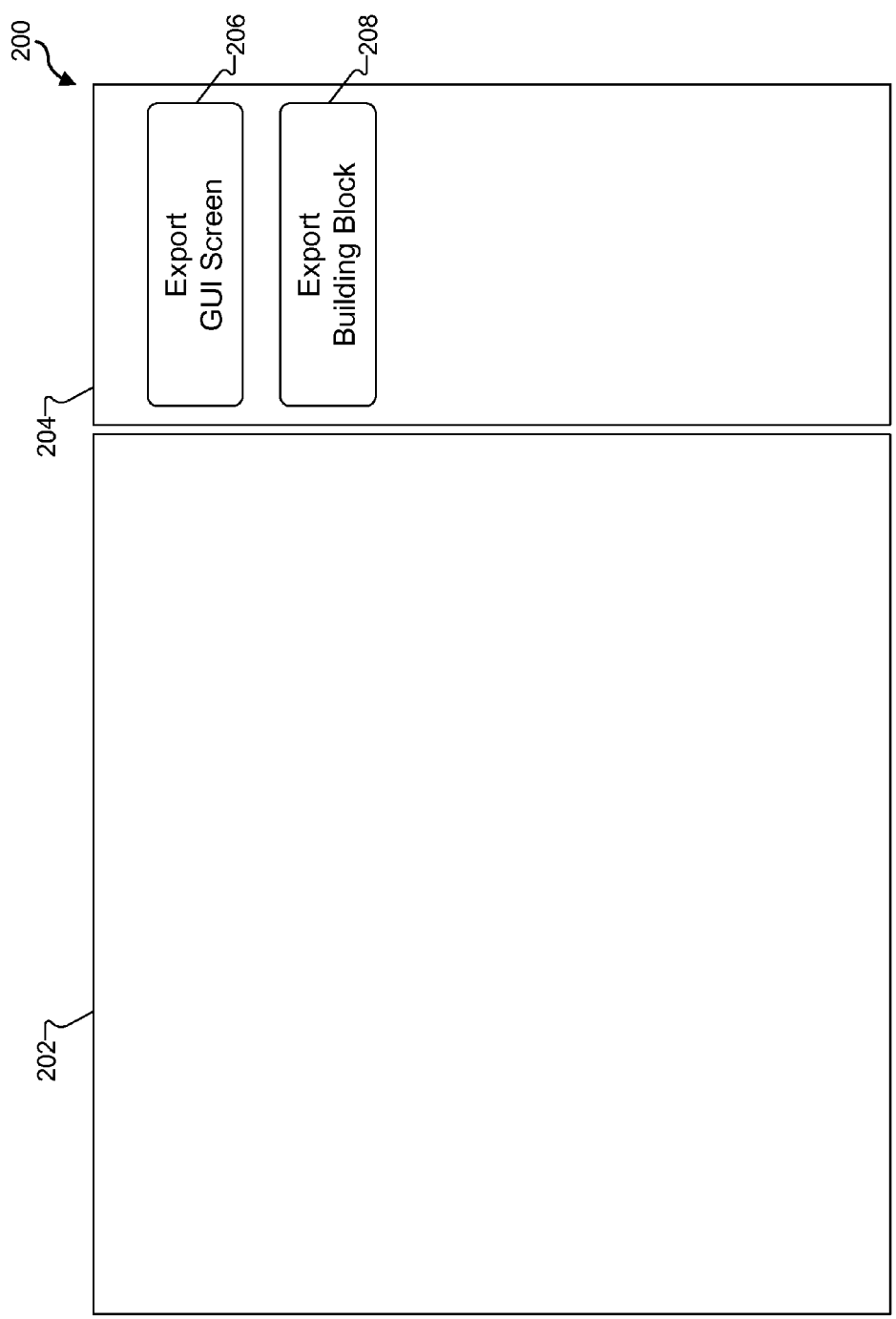
FIG. 2 illustrates an exemplary designer user interface with which a designer may interact to define a building block element design and/or a graphical user interface screen design.

FIG. 2 illustrates an exemplary designer user interface 200 that may be provided by design subsystem 102 and with which a designer may interact to define a building block element design and/or a GUI screen design. As shown, user interface 200 may include a design window 202 within which a designer may define a building block element design and/or a GUI screen design. The designer may interact with user interface 200 in any suitable way to define a building block element design and/or a GUI screen design in design window 202.

As shown in FIG. 2, user interface 200 may also include a control window 204, which may include selectable options 206 and 208. Option 206 may be selected by the designer to initiate automatic generation and export of a GUI screen by export subsystem 104 in accordance with a GUI screen design defined in design window 202, and option 208 may be selected by the designer to initiate automatic generation and export of a building block element by export subsystem 104 in accordance with a building block element design defined in design window 202.

A building block element design and/or a GUI screen design may include a visual layout of one or more graphical elements configured to be displayed within dimensions of a building block element and/or a GUI screen, respectively. A graphical element may include any element that may be visually displayed within a rendered GUI screen. For example, a graphical element may include one or more graphics, text, or a combination of text and one or more graphics that may be displayed within a rendered GUI screen. Examples of graphical elements may include, without limitation, a scroll bar, a navigation arrow, a button, a selector, a selectable menu option, a footer, a header, and any other graphic and/or text.

Figure 3:
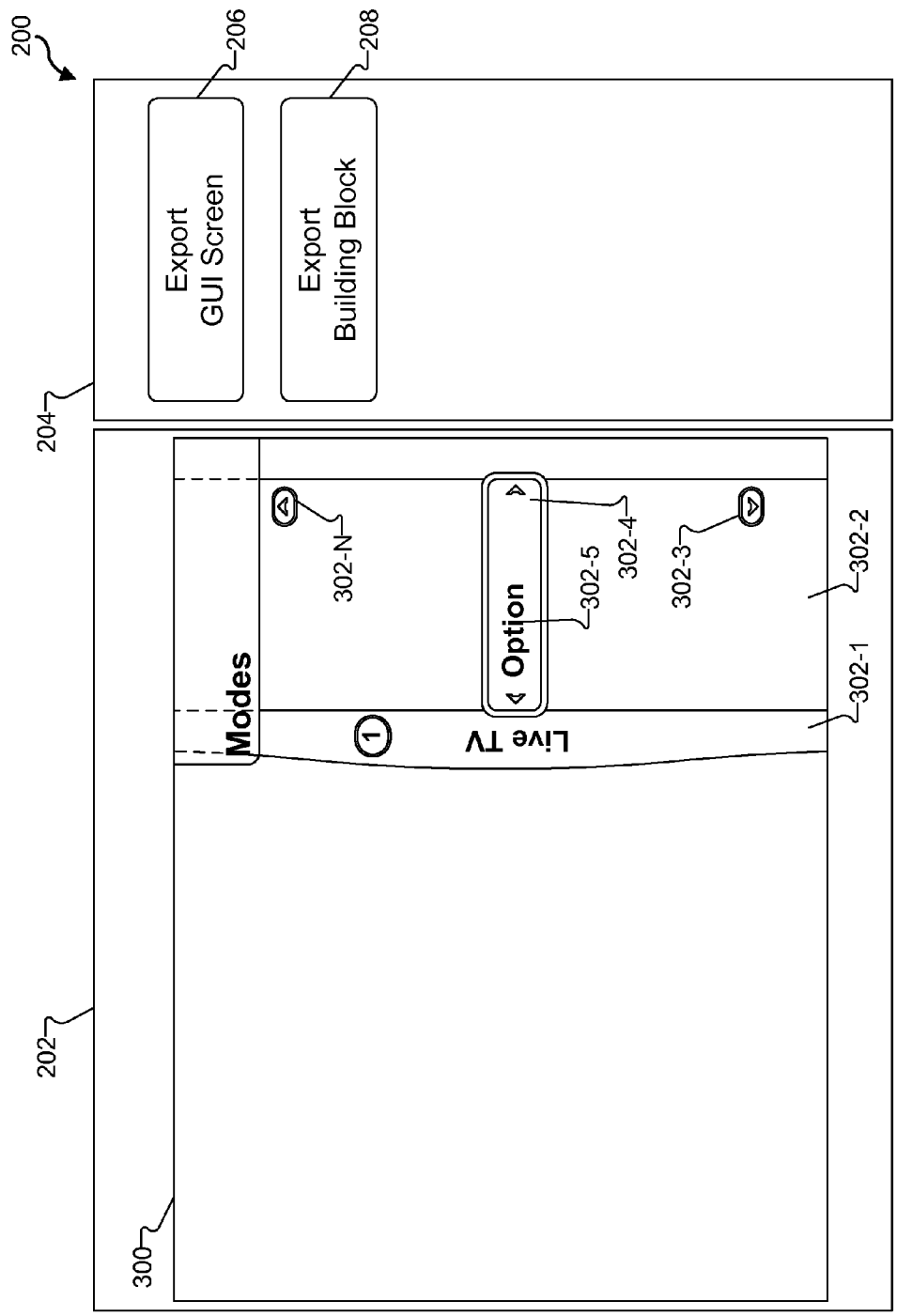
FIG. 3 illustrates a visual depiction of a graphical user interface screen design according to principles described herein.

FIG. 3 illustrates a visual depiction of a GUI screen design 300 as may be displayed within design window 202. As shown, GUI screen design 300 may include one or more graphical elements, such as, but not limited to, graphical elements 302-1 through 302-N, positioned within dimensions of GUI screen design 300 to form a visual layout of the graphical elements. Graphical elements, such as graphical elements 302-1 through 302-N, may be layered in a particular order within a GUI screen design. In some examples, each graphical element may correspond to a different layer of the GUI screen design.

Figure 4:
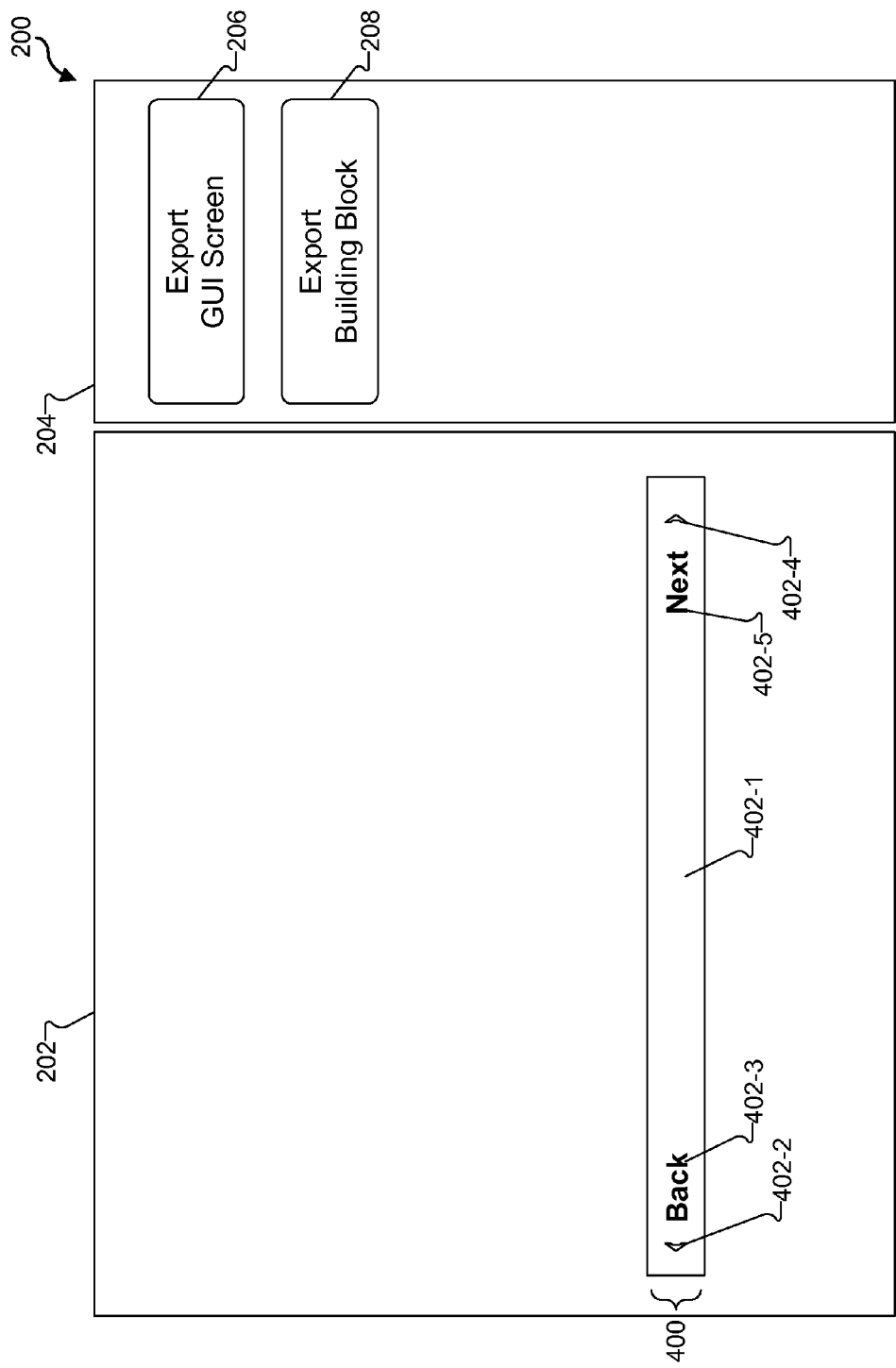
FIG. 4 illustrates a visual depiction of a building block element design according to principles described herein.

FIG. 4 illustrates a visual depiction of a building block element design 400 as may be displayed within design window 202. As shown, building block element design 400 may include one or more graphical elements, such as, but not limited to, graphical elements 402-1 through 402-5, positioned within dimensions of building block element design 400 to form a visual layout of the graphical elements. Graphical elements, such as graphical elements 402-1 through 402-5, may be layered in a particular order within a building block element design. In some examples, each graphical element may correspond to a different layer of the building block element design.

The illustrated exemplary building block element design 400 shown in FIG. 4 is for a "footer" building block element design configured to be used by export subsystem 104 to generate a "footer" building block element that may be included as a footer graphical element within a GUI screen. As shown in FIG. 4, building block element design 400 may include a footer bar graphical element 402-1 having a left arrow graphical element 402-2, a "back" text graphical element 402-3, a right arrow graphical element 402-4, and a "next" text graphical element 402-5 disposed therein as shown.

Figure 5:
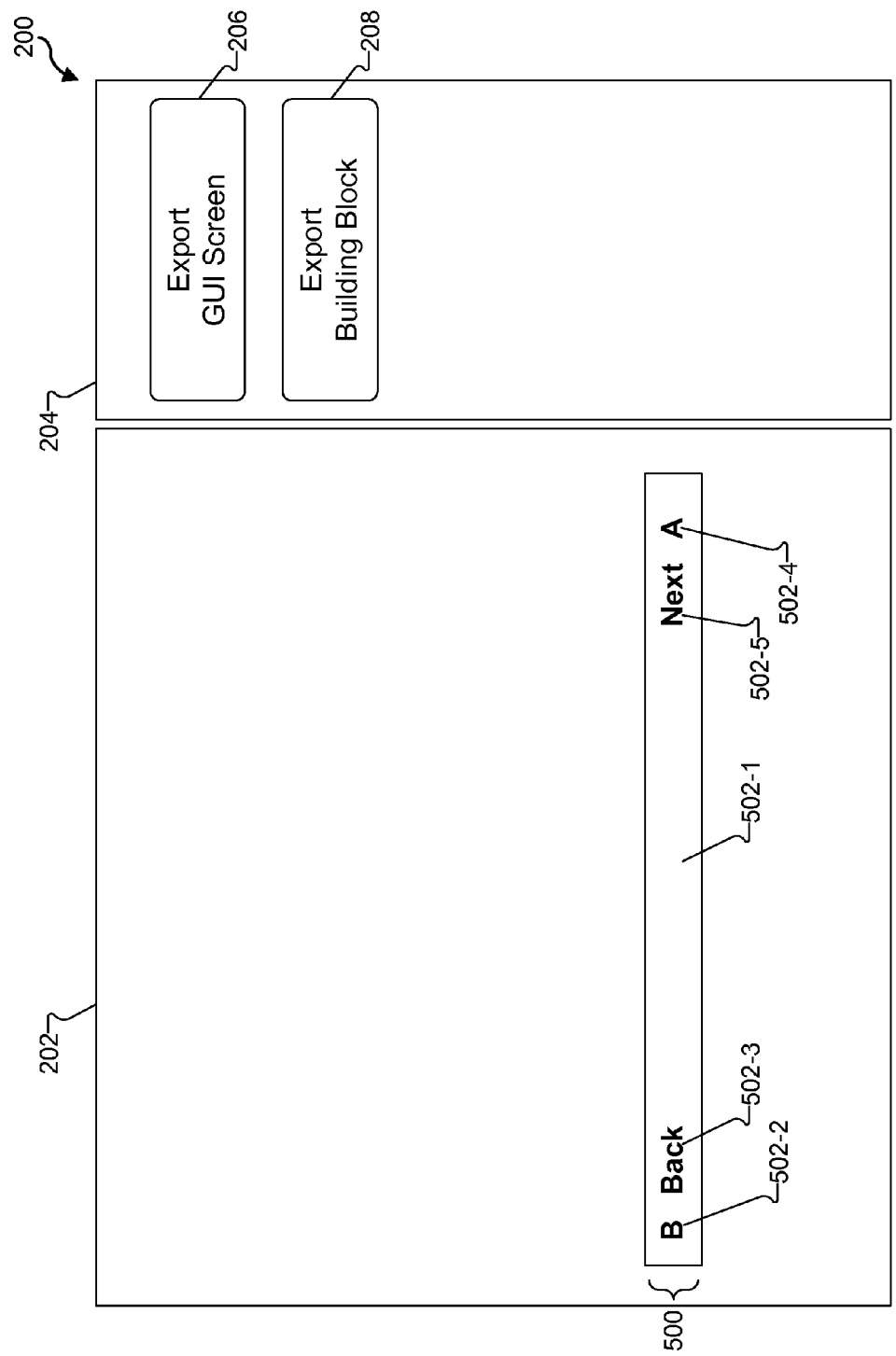
FIG. 5 illustrates a visual depiction of a different building block element design according to principles described herein.

FIG. 5 illustrates a visual depiction of a different building block element design 500 as may be displayed within design window 202. As shown, building block element design 500 may include one or more graphical elements, such as, but not limited to, graphical elements 502-1 through 502-5, positioned within dimensions of building block element design 500 to form a visual layout of the graphical elements. Graphical elements, such as graphical elements 502-1 through 502-5, may be layered in a particular order within a building block element design. In some examples, each graphical element may correspond to a different layer of the building block element design.

The illustrated exemplary building block element design 500 shown in FIG. 5 is for another "footer" building block element design configured to be used by export subsystem 104 to generate another "footer" building block element that may be included as a different footer graphical element within a GUI screen. As shown in FIG. 5, building block element design 500 may include a footer bar graphical element 502-1 having a left arrow graphical element 502-2, a "back" text graphical element 502-3, a right arrow graphical element 502-4, and a "next" text graphical element 502-5 disposed therein as shown.

While "footer" building block element designs are shown in FIGS. 4-5 and described in certain examples herein, these examples are illustrative only and not limiting. Additional or alternative building block elements may be defined in design window 202 and used in any of the ways described herein.

In certain examples, all graphical elements included in design window 202 may be considered to belong to a building block element design, such as when a designer uses design window 202 to exclusively define a building block element design (as illustrated in FIGS. 3-4). In other examples, only select graphical elements included in design window 202 may be considered to belong to a building block element design. For example, design window 202 may be used by a designer to define a GUI screen design. The designer may want to define part of the GUI screen design as a building block element design. User interface 200 may provide the designer with one or more tools for selecting certain graphical elements (e.g., a subset of graphical elements) within design window 202 such that the designer may indicate specific graphical elements as belonging to a building block element design.

To illustrate, with GUI screen design 300 included in design window 202 as shown in FIG. 3, the designer may provide input to mark one or more graphical elements included in GUI screen design 300. For example, the designer may want to define graphical element 302-3 as a "down arrow" building block element design. The designer may mark the one or more element of graphical element 302-3 in any suitable way to designate graphical element 302-3 as a building block element design. With graphical element 302-3 designated as a building block element design, the designer may select option 208 to initiate generation and export of a building block element in accordance with the building block element design.

User interface 200 may also provide the designer with any suitable tools for use in naming or otherwise providing an identifier for a building block element design. For example, through user interface 200, the designer may apply a name of "footer" to building block element design 400 and/or 500. The identifier may be used by system 100 to generate, identify, and/or use a building block element.

User interface 200 may also provide the designer with any suitable tools for use in associating a building block element design with one or more computing platforms. As used herein, the term "computing platform" may refer to a computing architecture, process, and/or system configured to process a particular type or format of data, process data in a particular way, and/or perform computing operations in a particular way that is distinct from another computing platform. For example, different computing platforms may be configured to render a graphical user interface in different ways, using different data formats, based on different style guides or requirements, and/or in accordance with different GUI rendering heuristics. Accordingly, the designer may define particular building block element designs for particular computing platforms and may provide input indicating to which computing platforms the building block element designs are to be associated.

To illustrate, building block element design 400 shown in FIG. 4 may be designed for a first set of one or more computing platforms that, in accordance with requirements and/or style guides associated with the computing platforms, use "left arrow" and "right arrow" input buttons for navigation backward and forward with a GUI, respectively. Accordingly, building block element design 400 may include left arrow graphical element 402-2 and right arrow graphical element 402-4. Similarly, building block element design 500 shown in FIG. 5 may be designed for a second set of one or more computing platforms that, in accordance with requirements and/or style guides associated with the computing platforms, use "B" and "A" input buttons for navigation backward and forward with a GUI, respectively. Accordingly, building block element design 500 may include "B" text graphical element 502-2 and "A" text graphical element 502-4.

The designated association of a building block element design with one or more computing platforms may be provided by the designer in any suitable way. For example, designations of computing platforms associated with a building block element design may be included in a building block element design identifier (e.g., as a prefix or suffix to the name of the building block element design).

Design subsystem 102 may be configured to maintain data representative of a building block element design and/or a GUI screen design defined by a designer. The data representative of the building block element design and/or the GUI screen design may be maintained in any suitable data format, such as a vector-based, bitmap-based, or other suitable data format.

Design subsystem 102 may be configured to maintain data representative of one or more graphical elements included in a building block element design and/or a GUI screen design. Data representative of a graphical element may include an identifier for the graphical element (e.g., an element or layer name), position data indicative of a position of the graphical element within the GUI screen design, pixel data for the graphical element (e.g., pixel data specifying hue, color, saturation, transparency, brightness, and/or other attributes of one or more pixels), text data (e.g., text string, font size, letting information, alignment, and/or other text properties), and any other data descriptive of or otherwise associated with the graphical element.

With a design defined in design window 202, a designer may select option 206 to export the design as a GUI screen or option 208 to export the design as a building block element. In response to a selection of option 206 or option 208, export subsystem 104 may interface with design subsystem 102 to access data representative of the design and to automatically generate a GUI screen or a building block element, respectively, as described herein.

Design subsystem 102 may include an interface through which export subsystem 104 may interface with design subsystem 102. Any suitable interface may be employed, such as one or more application program interfaces ("APIs").

Export subsystem 104 may be configured to interface with design subsystem 102, including interacting with design subsystem 102 to access and/or facilitate processing of data representative of a building block element design and/or a GUI screen design. Export subsystem 104 may utilize the accessed data and/or the interface with design subsystem 102 to automatically generate and export data representative of a building block element and/or GUI screen, which may include automatically generating and exporting computing code and/or one or more graphical elements configured to be processed by one or more target computing devices (e.g., target computing devices having different computing platforms) to render one or more building block elements and/or GUI screens in accordance with the building block element design and/or the GUI screen design.

As used herein, the term "computing code" may refer to any code that may be processed by a computing device to render a building block element and/or a GUI screen for display. As an example, computing code may include programming code such as source code, object code, and/or other executable code. As another example, computing code may include one or more data structures containing data representative of a building block element and/or a GUI screen, wherein the data in the one or more data structures is configured to be parsed by a computing device to render the building block element and/or the GUI screen. Examples of such data structures may include an Extensible Markup Language ("XML") data structure, a comma-separated value ("CSV") data structure, and any other data structure that may be parsed by a computing device to render a building block element and/or a GUI screen. The term "building block computing code" may be used herein to refer to computing code generated by export subsystem 104 and configured to be processed by a computing device to render a building block element for display. The term "GUI screen computing code" may be used herein to refer to computing code generated by export subsystem 104 and configured to be processed by a computing device to render a GUI screen for display.

Figure 6:
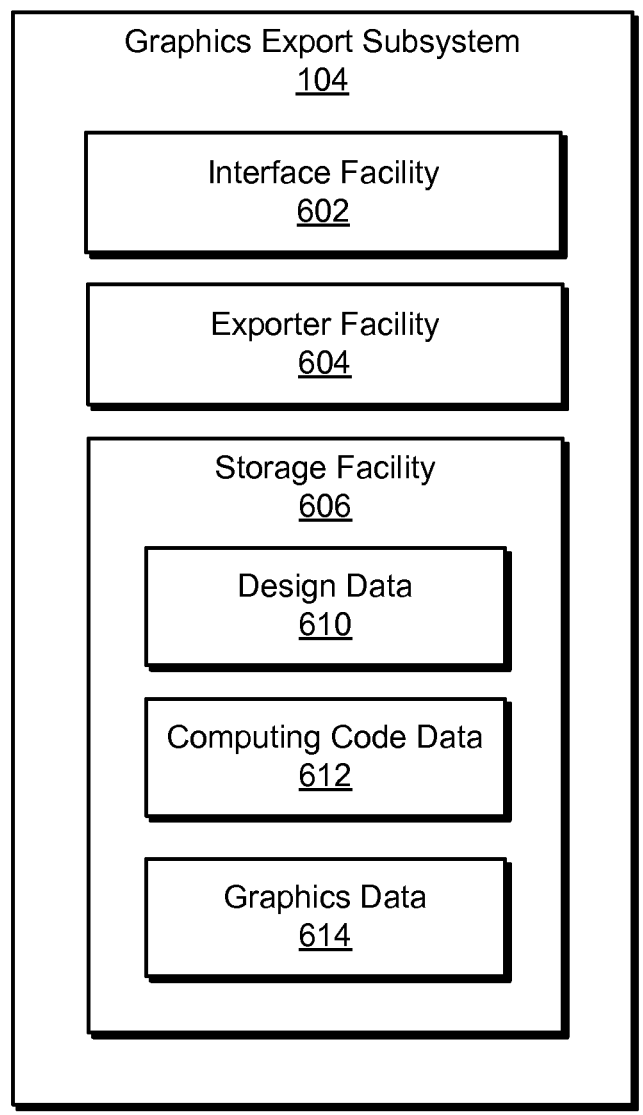
FIG. 6 illustrates exemplary components of a graphics export subsystem according to principles described herein.

FIG. 6 illustrates exemplary components of export subsystem 104. As shown, export subsystem 104 may include, without limitation, an interface facility 602, an exporter facility 604, and a storage facility 606, which may be in communication with one another using any suitable communication technologies. It will be recognized that although facilities 602-606 are shown to be separate facilities in FIG. 6, any of facilities 602-606 may be combined into fewer facilities, such as into a single facility, or divided into more facilities as may serve a particular implementation.

Interface facility 602 may be configured to provide an interface through which export subsystem 104 may interface with design subsystem 102. Interface facility 602 may employ any suitable technologies to provide the interface with design subsystem 102. For example, interface facility 602 may be configured to interface with one or more APIs of design subsystem 102.

Through an interface with design subsystem 102, export subsystem 104 may access data representative of a building block element design and/or a GUI screen design maintained by design subsystem 102. Additionally or alternatively, through an interface with design subsystem 102, export subsystem 104 may access and leverage one or more capabilities of design subsystem 102. For example, export subsystem 104 may instruct design subsystem 102 to perform one or more operations to process data representative of a building block element design, a GUI screen design, and/or graphical elements included in the building block element design and/or the GUI screen design. Examples of export subsystem 104 interfacing with design subsystem 102 are described further below.

Interface facility 602 may be further configured to provide an interface through which export subsystem 104 may interface with distribution subsystem 106. Interface facility 602 may employ any suitable technologies for providing an interface with distribution subsystem 106. Through an interface with distribution subsystem 106, export subsystem 104 may export data, including computing code and/or graphical elements generated by export subsystem 104, to distribution subsystem 106 for storage and/or distribution to and access by a developer. Through an interface with distribution subsystem 106, export subsystem 104 may also access data stored in a repository in distribution subsystem 106. For example, export subsystem 104 may access data representative of one or more building block elements and/or data associated therewith stored in a repository of exported building block elements, as described herein.

In certain examples, interface facility 602 may be configured to interface with design subsystem 102 to leverage a user interface and/or user interface capabilities native to design subsystem 102. For example, interface facility 602 may instruct design subsystem 102 to display certain selectable options and/or content in a user interface of design subsystem 102. The options may be selectable to control operations of export subsystem 104 (e.g., an option may be selected to initiate automatic generation and export of a building block element and/or a GUI screen). The content may be representative of one or more operations performed by export subsystem 104 such that a designer may be apprised of the status of operations of export subsystem 104. For instance, the designer may be audibly and/or visually notified when one or more operations of export subsystem 104 are being performed and/or have completed.

Exporter facility 604 may be configured to automatically generate and export computing code and/or one or more graphical elements configured to be processed by one or more target computing devices (e.g., target computing devices having different computing platforms) to render one or more building block elements and/or GUI screens in accordance with a building block element design and/or a GUI screen design. The computing code and/or one or more graphical elements may be generated and exported in any suitable way, including in any of the ways described herein and/or in co-pending U.S. patent application Ser. No. 12/983,109, entitled AUTOMATED GRAPHICAL USER INTERFACE DESIGN AND DEVELOPMENT SYSTEMS AND METHODS, and filed concurrently herewith, the contents of which are hereby incorporated by reference.

In certain embodiments, exporter facility 604 may be configured to generate computing code in multiple different languages, which may include different programming languages and/or data structures. Accordingly, the computing code may be configured to be processed by one or more target computing devices having multiple different computing platforms.

As used herein, the term "computing device" or "target computing device" may refer to any computing device configured to provide a GUI. In particular, a computing device may be configured to process computing code to render a GUI. Typically, a user of the computing device may utilize the computing device and/or other devices connected to the computing device to interact with the GUI.

Export subsystem 104 may be configured to export data representative of generated computing code, graphical elements, and/or other data generated by exporter facility 604 to distribution subsystem 106. The data may be exported to distribution subsystem 106 in any suitable way, including through an interface provided by interface facility 602. In certain implementations, data generated by exporter facility 604 may be automatically exported by export subsystem 104 to distribution subsystem 106.

Storage facility 606 may be configured to maintain data accessed by interface facility 602, used by exporter facility 604, and/or output by exporter facility 604. For example, storage facility 606 may maintain design data 610 representative of building block element designs and/or GUI screen designs accessed by interface facility 602, as well as computing code data 612 representative of computing code (e.g., any of the computing code described herein) graphics data 614 representative of one or more graphical elements generated and exported by exporter facility 604. Storage facility 606 may be configured to maintain additional and/or alternative data as may suit a particular implementation.

Referring again to FIG. 1, distribution subsystem 106 may be configured to provide a developer with access to computing code, graphics data, and/or any other data exported by export subsystem 104. Distribution subsystem 106 may be configured to provide the access in any suitable way. For example, distribution subsystem 106 may include one or more staging servers and/or one or more data repositories that may be accessed by a developer. Additionally or alternatively, distribution subsystem 106 may be configured to provide a notification service configured to notify a developer of exported data (e.g., by sending a notification email to the developer).

In certain implementations, distribution subsystem 106 may include a designer repository configured to maintain exported data and a developer repository (e.g., a version control repository) synchronized to include the same data as the designer repository. In such a configuration, export subsystem 104 may export data to the designer repository, which may store the data and automatically communicate with the developer repository such as by providing one or more updates for use by the developer repository to update data in the developer repository to match the data in the designer repository. In certain examples, the synchronized repositories may be configured to store data in matching directory data structures, which may further automate development of computing code.

The data exported by export subsystem 104 and made available to a developer by distribution subsystem 106 may be in a form that is beneficial to the developer. For example, rather than having to manually produce computing code for a building block element and/or a GUI screen based on a building block element design and/or a GUI screen design as required in conventional GUI design and development processes, a developer with access to data exported by export subsystem 104 may conveniently insert, or otherwise make reference to, exported computing code, such as by copying and pasting the pre-generated computing code into code being produced by the developer or into another appropriate location for processing by a target computing device. This may be done by the developer because the computing code exported by export subsystem 104 is configured to be processed by a target computing device to render a building block element and/or a GUI screen. Consequently, the developer is able to produce code for rendering a building block element and/or a GUI screen more efficiently and with fewer opportunities for error when compared to conventional GUI design and development processes.

Additionally or alternatively, distribution subsystem 106 may be configured to store and maintain data representative of exported building block elements in a repository of building block elements. The building block element data in the repository of building block elements may be made accessible by export subsystem 104 for use in generating and exporting computing code and/or graphical elements for a GUI screen design, as described herein. Certain data included in the repository of building block element may be made accessible by design subsystem 102 for use by a designer in defining a GUI screen design, as described herein.

Figure 7:
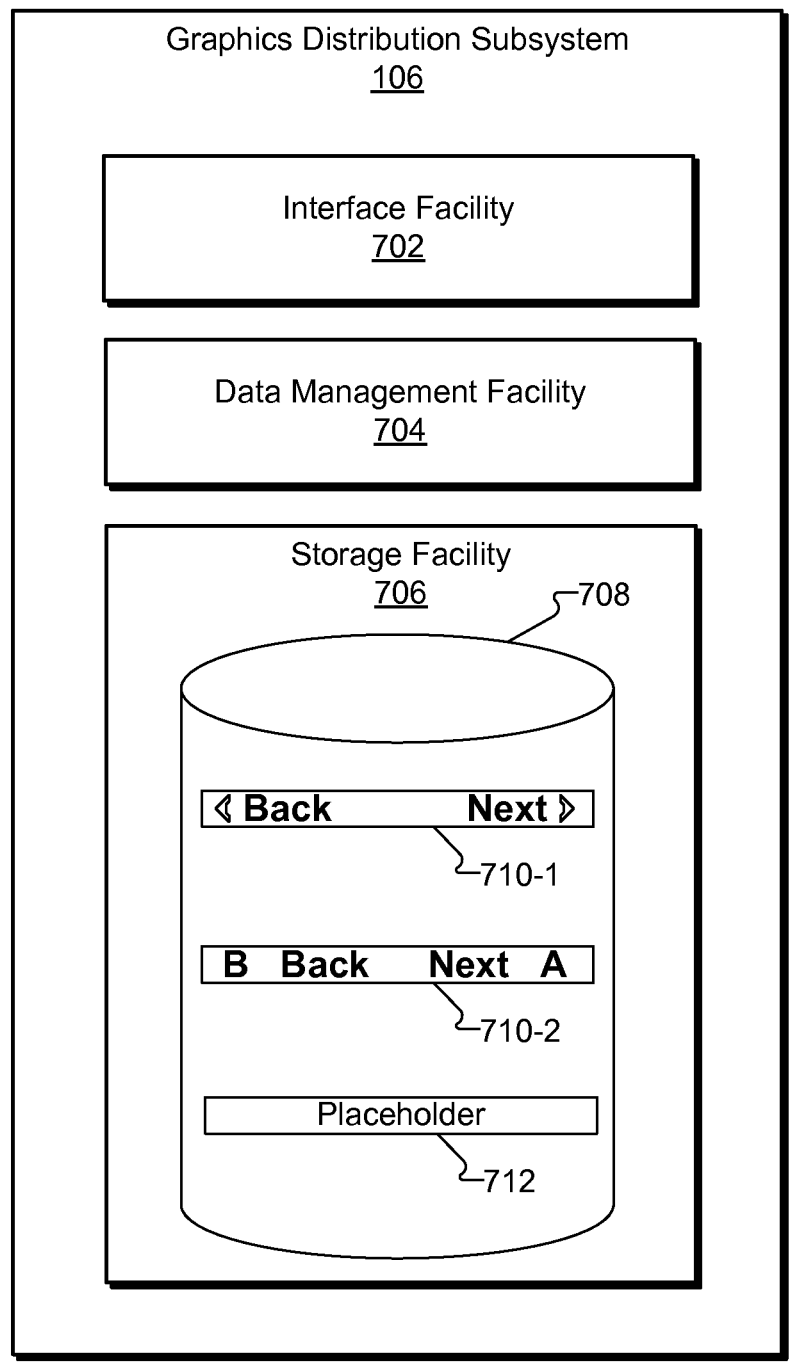
FIG. 7 illustrates exemplary components of a graphics distribution subsystem according to principles described herein.

FIG. 7 illustrates exemplary components of distribution subsystem 106. As shown, distribution subsystem 106 may include, without limitation, an interface facility 702, a data management facility 704, and a storage facility 706, which may be in communication with one another using any suitable communication technologies. It will be recognized that although facilities 702-706 are shown to be separate facilities in FIG. 7, any of facilities 702-706 may be combined into fewer facilities, such as into a single facility, or divided into more facilities as may serve a particular implementation.

Interface facility 702 may be configured to provide an interface through which a developer may access data stored in storage facility 706. For example, a developer and/or a tool used by the developer may access data representative of exported computing code and/or graphical elements stored in storage facility 706 such that the developer may utilize the accessed data as may suit a particular objective of the developer. Interface facility 702 may employ any suitable technologies to provide a developer interface.

Interface facility 702 may be configured to provide an interface through which export subsystem 104 may interface with design subsystem 102. Interface facility 702 may employ any suitable technologies to provide the interface with design subsystem 102. For example, interface facility 702 may be configured to provide one or more APIs with which design subsystem 102 may interact. Through an interface with distribution subsystem 106, design subsystem 102 may access data representative of or otherwise associated with exported building block elements and/or building block element placeholders associated with the building block elements for use by a designer in defining a GUI screen design, as described herein.

Interface facility 702 may be further configured to provide an interface through which export subsystem 104 may interface with distribution subsystem 106. Interface facility 702 may employ any suitable technologies for providing an interface with export subsystem 104. Through an interface with distribution subsystem 106, export subsystem 104 may export data, including computing code and/or graphical elements generated by export subsystem 104, to distribution subsystem 106 for storage and/or distribution. Through an interface with distribution subsystem 106, export subsystem 104 may also access data stored in a repository in distribution subsystem 106. For example, export subsystem 104 may access data representative of one or more building block elements and/or data associated therewith stored in a repository of exported building block elements, as described herein.

Data management facility 704 may be configured to manage data stored in storage facility 706. For example, data management facility 704 may perform one or more data management operations such as storing, querying, retrieving, copying, modifying, organizing, and/or deleting data in storage facility 706. In certain implementations, data management facility 704 may be configured to maintain exported data associated with one or more GUI screen designs and exported data associated with one or more building block element designs separate from one another, such as in separate repositories.

Storage facility 706 may be configured to maintain data exported by export subsystem 104. For example, storage facility 706 may maintain a repository 708 of data representative of or otherwise associated with building block elements exported by export subsystem 104. FIG. 7 illustrates exemplary building block elements 710-1 and 710-2 stored in the repository 708. As illustrated, building block elements 710-1 and 710-2 may correspond to building block element designs 400 and 500 shown in FIGS. 4-5, respectively.

Data in the repository 708 may be in any suitable format and may contain any information representative of or otherwise associated with exported building block elements. For example, data in the repository 708 may include building block computing code and/or graphical elements that make up the building block elements. For instance, building block element 710-1 may include building block computing code and/or one or more graphical elements exported by export subsystem 104 and that make up building block element 710-1. Building block element 710-1 may also include data representative of an identifier for the building block element 710-, one or more computing platforms designated as being associated with building block element 710-1, and/or any other data associated with building block element 710-1.

As shown in FIG. 7, the repository 708 may also include data representative of a building block placeholder element 712, which may be designated as a placeholder element for building block elements 710-1 and 710-2. Placeholder element 712 may be made available to design subsystem 102 for access and use by a designer to define a GUI screen design. For example, the designer may insert a visual depiction of placeholder element 712 within a GUI screen design to indicate that export subsystem 104 is to access and use building block elements 710-1 and/or 710-2 stored in the repository 708 to generate GUI screen computing code and/or graphical elements for the GUI screen design, as described herein.

Exemplary building block based GUI design and developments methods, including methods for creating and using building block elements, will now be described.

Figure 8:
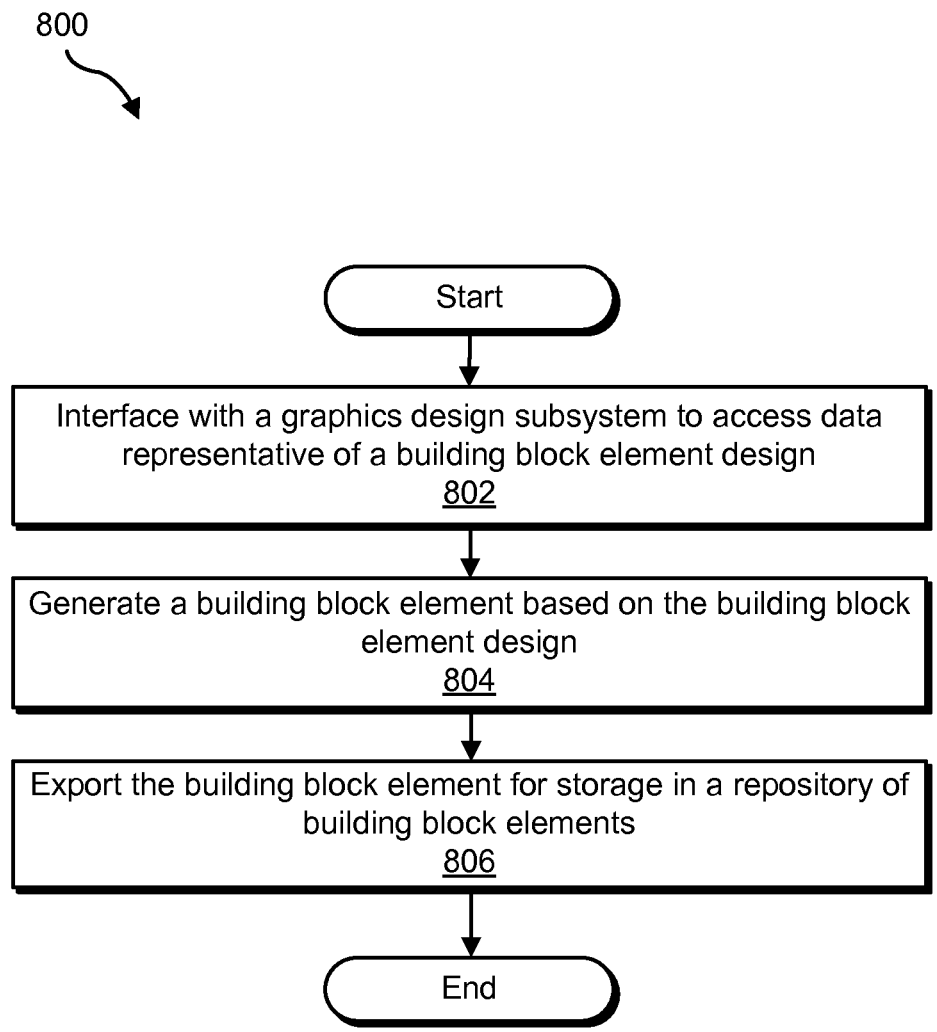
FIG. 8 illustrates an exemplary method of automatically creating a building block element according to principles described herein.

FIG. 8 illustrates an exemplary method 800 of automatically creating a building block element. While FIG. 8 illustrates exemplary steps according to certain embodiments, other embodiments may omit, add to, reorder, combine, and/or modify any of the steps shown in FIG. 8. The steps shown in FIG. 8 may be performed by export subsystem 104 and/or any other component(s) of system 100.

In step 802, export subsystem 104 may interface with a graphics design subsystem to access data representative of a building block element design. Step 802 may be performed in any of the ways described herein. For example, export subsystem 104 may interface with design subsystem 102 to access data representative of a building block element design such as building block element design 400 or 500. In certain examples, step 802 may be performed in response to a designer selecting option 208 to initiate generation and export of a building block element design defined within design window 202 of user interface 200.

In step 804, export subsystem 104 may generate a building block element based on the building block element design accessed in step 802. Step 804 may be performed automatically by export subsystem 104 in any of the ways described herein. As described above, the building block element generated in step 804 may include building block computing code, one or more graphical elements, an identifier (e.g., a name), designations of computing platforms associated with the building block element, and/or any other data representative of or otherwise associated with the building block element. Step 804 may include designating the building block element as a building block element such that the building block element may be used by export subsystem 104 in generating GUI screen computing code and/or graphical elements for a GUI screen design, as described herein. Step 804 may also include export subsystem 104 generating data representative of a building block placeholder element associated with the generated building block element.

In step 806, export subsystem 104 may export data representative of the building block element generated in step 804 for storage in a repository of building block elements. For example, export subsystem 104 may export data representative of the building block element to distribution subsystem 106 for storage in repository 708. The building block element may be designated as a building block element in the repository. Accordingly, the building block element stored in the repository may be accessible by export subsystem 104 for use in generation of GUI screen computing code and/or one or more graphical elements configured to be processed by a target computing device to render a GUI screen in accordance with a GUI screen design, as described herein.

Step 806 may also include export subsystem 104 exporting a building block placeholder element associated with the building block element. The placeholder element may be integrated within or separate of the building block element. The placeholder element may be exported to distribution subsystem 106 for storage in the repository of building block elements such that the placeholder element may be made accessible to design subsystem 102 for use by a designer in defining a GUI screen design, as described herein.

One or more steps of method 800 may be repeated to automatically generate and export an additional building block element. To illustrate, method 800 may be performed a first time to generate and export a building block element representative of a first building block element design. Method 800 may be performed again to automatically generate and export an additional building block element based on an additional building block element design. For instance, method 800 may be performed a first time to generate and export building block element 710-1 based on building block element design 400 of FIG. 4. Method 800 may be performed a second time to automatically generate and export building block element 710-2 based on building block element design 500 of FIG. 5. In some examples, exported building block element 710-1 may be accessible by export subsystem 104 for use in automatic generation of GUI screen computing code and/or one or more graphical elements configured to be processed by a target computing device to render a GUI screen in accordance with a GUI screen design, and exported building block element 710-2 may be accessible by export subsystem 104 for use in automatic generation of additional GUI screen computing code and/or one or more graphical elements configured to be processed by a different target computing device to render an additional GUI screen in accordance with the GUI screen design.

In the present example, placeholder element 712 may be generated and exported in any suitable manner. For example, placeholder element 712 may be generated and exported in conjunction with the first performance of method 800. Thereafter, method 800 may detect that placeholder element 712 has already been generated and, in response to this detection, not generate the placeholder element 712 again during the second performance of method 800 or for any other "footer" building block element designs (e.g., for any other building block element designs having a common name such as "footer").

While an example of export subsystem 104 generating and exporting data representative of building block elements for storage in the repository 708 has been described, this is illustrative only. Data representative of building block elements may be stored in the repository in any suitable additional or alternative way, including by manual creation and storage of data representative of building block elements in the repository 708.

Figure 9:
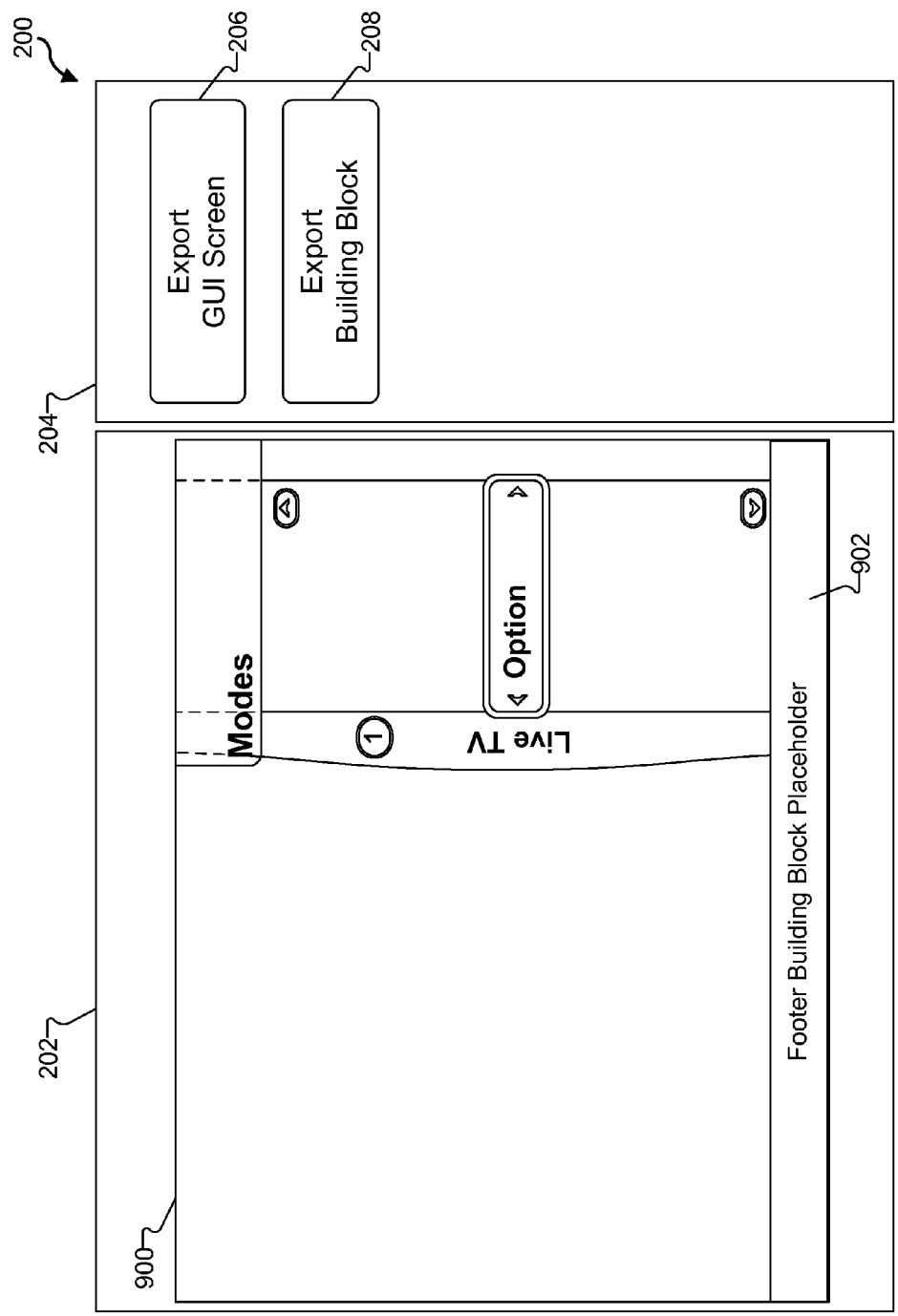
FIG. 9 shows a visual depiction of a graphical user interface screen design displayed within design window according to principles described herein.

As mentioned, exported building block elements stored in the repository 708 may be made accessible for use by export subsystem 104 in generating and exporting GUI screen code and/or graphical elements for a GUI screen design. To illustrate, FIG. 9 shows a visual depiction of a GUI screen design 900 displayed within design window 202 of user interface 200. As shown, GUI screen design 900 may include one or more graphical elements, including a building block placeholder element 902. Through user interface 200, a designer may access and insert a building block placeholder element such as placeholder element 902 in a GUI screen design. User interface 200 may provide any suitable tools for use by the designer to access and insert one or more building block placeholder elements in a GUI screen design.

To support access and insertion of building block placeholder elements in GUI screen designs, design subsystem 102 may be configured to interface with distribution subsystem 106 to access data representative of one or more building block placeholder elements stored in the repository 708 of building block elements. For example, design subsystem 102 may be configured to query the repository 708 to identify and access data associated with any building block elements meeting certain search criteria. The search criteria may be provided by the designer and/or automatically selected by design subsystem 102 based on one or more attributes of the GUI screen design defined in design window 202. For example, in defining a GUI screen design, a designer may specify one or more computing platforms for which the GUI screen design is being defined. Design subsystem 102 may use this information to query the repository 708 of building block elements to identify any building block elements that have been designated as being associated with the same computing platforms. As another example, a designer may specify a search term such as "footer," and design subsystem 102 may use this search term to query the repository 708 of building block elements to identify any building block elements that have been designated as "footer" building block elements. In this or a similar manner, design subsystem 102 may be configured to provide information associated with relevant building block elements that are available for use by a designer.

With GUI screen design 900 defined in design window 202 as shown in FIG. 9, the designer may select option 206 to initiate an export of a GUI screen in accordance with GUI screen design 900. In response, export subsystem 104 may perform one or more operations to automatically generate and export data representative of the GUI screen in accordance with GUI screen design 900.

Figure 10:
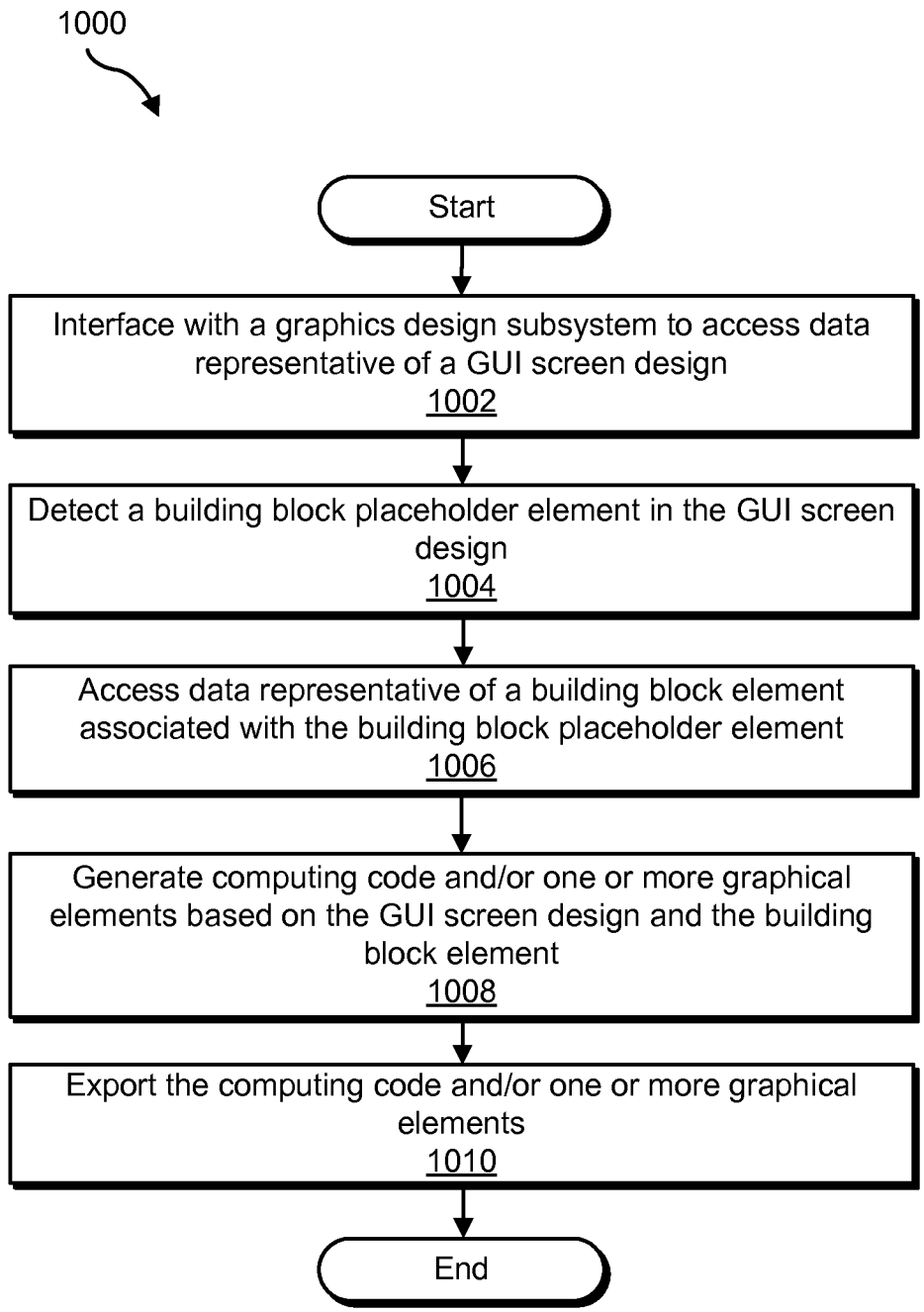
FIG. 10 illustrates an exemplary method of automatically creating a graphical user interface screen based on a graphical user interface screen design containing a building block placeholder element according to principles described herein.

To illustrate export operations that may be performed by export subsystem 104 when a GUI screen design contains a building block placeholder element, FIG. 10 illustrates an exemplary method of automatically creating a graphical user interface screen based on a graphical user interface screen design containing a building block placeholder element. While FIG. 10 illustrates exemplary steps according to certain embodiments, other embodiments may omit, add to, reorder, combined, and/or modify any of the steps shown in FIG. 10. The step shown in FIG. 10 may be performed by export subsystem 104 and/or any other components of system 100.

In step 1002, export subsystem 104 may interface with a graphics design system such as design subsystem 102 to access data representative of a GUI screen design. Step 1002 may be performed in any of the ways described herein. For example, export subsystem 104 may interface with design subsystem 102 to access data representative of GUI screen design 900.

In step 1004, export subsystem may detect a building block placeholder element in the GUI screen design. For example, export subsystem 104 may detect building block placeholder element 902 in GUI screen design 900. Export subsystem 104 may be configured to detect a building block placeholder element included in a GUI screen design in any suitable way. For example, an identifier or other data associated with the placeholder element may include data designating the element to be a placeholder element, and export subsystem 104 may be configured to detect the designation.

In step 1006, export subsystem 104 may access data representative of a building block element associated with the building block placeholder element detected in step 1004. For example, export subsystem 104 may access data representative of building block element 710-1 or 710-2 associated with building block placeholder element 902 included in GUI screen design 900.

Export subsystem 104 may be configured to access the data representative of the building block element associated with the building block placeholder element in any suitable way. For example, export subsystem 104 may interface with distribution subsystem 106 to query the repository 708 for a building block element associated with the building block placeholder element. The query may include any information that may be helpful for identifying a relevant building block element. For example, the query may include data representative of an identifier for the building block placeholder element, identifiers for one or more computing platforms associated with the building block placeholder element and/or the GUI screen design, and/or any other information.

In step 1008, export subsystem 104 may automatically generate computing code and/or one or more graphical elements based on the GUI screen design and the building block element accessed in step 1006. Step 1008 may be performed in any of the ways described herein. For example, export subsystem 104 may automatically generate GUI screen computing code configured to be processed by a target computing device to render a GUI screen in accordance with the GUI screen design. The generation of the GUI screen computing code may include inserting the data representative of the building block element (e.g., building block computing code) accessed in step 1006 into the GUI screen computing code. By inserting building block computing code accessed in step 1006 into GUI screen computing code being generated in step 1008, the generation of the GUI screen computing code may be made more efficient and/or reliable compared to a generation of GUI computing code from scratch for each element included in the GUI screen design. In other words, pre-generated building block computing code may be used and re-used by inserting the pre-generated building block computing code in GUI screen computing code as indicated by one or more building block placeholder elements included in a GUI screen design.

In step 1010, export subsystem 104 may export the computing code and/or one or more graphical elements generated in step 1008. For example, export subsystem 104 may export the computing code and/or one or more graphical elements to distribution subsystem 106 for storage and access by a developer, such as described herein.

One or more steps of method 1000 may be repeated. For example, steps 1006-1010 may be repeated for each building block element determined to be associated with the building block placeholder element and/or for each computing platform for which GUI screen computing code and/or graphical elements are to be generated and exported. To illustrate, steps 1006-1010 may be performed a first-time to access and use data representative of building block element 710-1 to generate and export GUI screen computing code and/or one or more graphical elements based on GUI screen design 900 and building block element 710-1. Steps 1006-1010 may be performed a second time to access and use data representative of building block element 710-2 to generate and export GUI screen computing code and/or one or more graphical elements based on GUI screen design 900 and building block element 710-2.

In certain examples, steps 1006-1010 may be repeated for each computing platform for which export subsystem 104 is configured to generate GUI screen computing code for a GUI screen design. For example, in response to a user command to export a GUI screen design, export subsystem 104 may generate and export GUI screen computing code for each of a plurality of different computing platforms. For each of the computing platforms, steps 1006-1010 may be repeated and export subsystem 104 may select and use a particular building block element associated with the computing platform.

In certain examples, the repository 708 may not include a building block element for a particular computing platform. For such situations, export subsystem 104 may be configured to perform any suitable operations. For example, export subsystem 104 may be configured to skip over generating and exporting computing code for a placeholder element. As another example, export subsystem 104 may be configured to use a placeholder, default, or error message building block element to generate computing code for the placeholder element.

Figure 11:
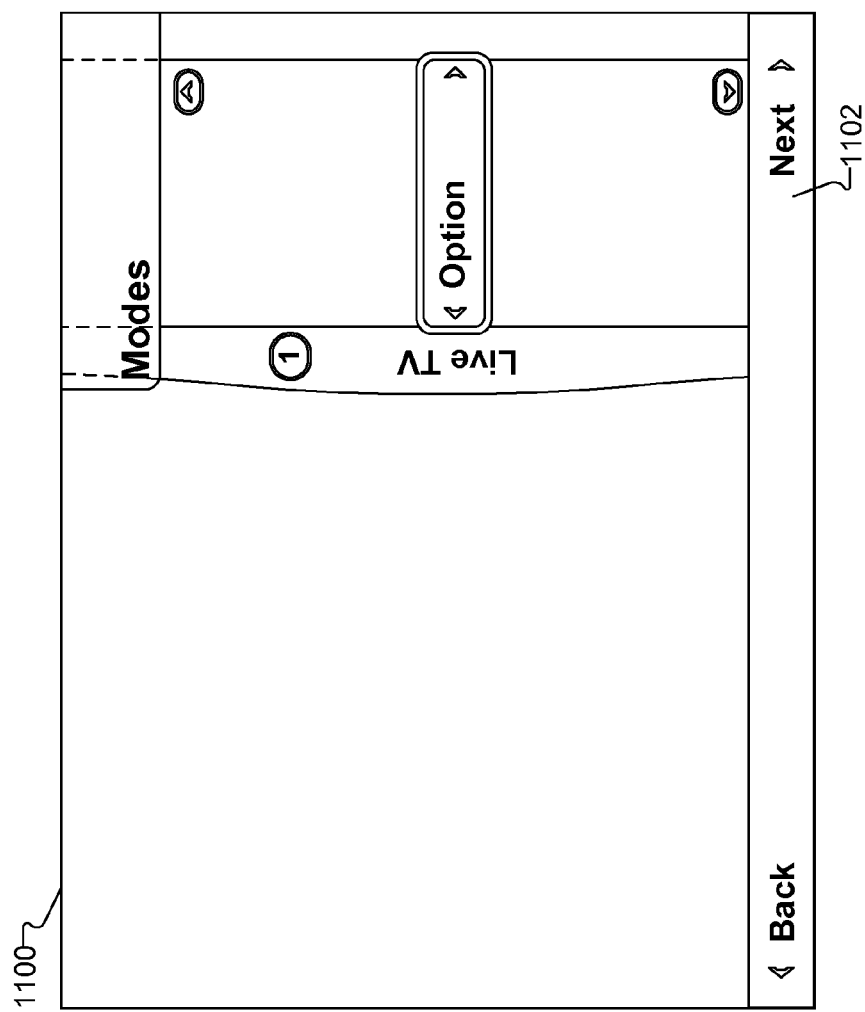
FIGS. 11-12 illustrate exemplary GUI screens that may be rendered by computing devices of different computing platforms processing computing code generated and exported by an export subsystem according to principles described herein.
Figure 12:
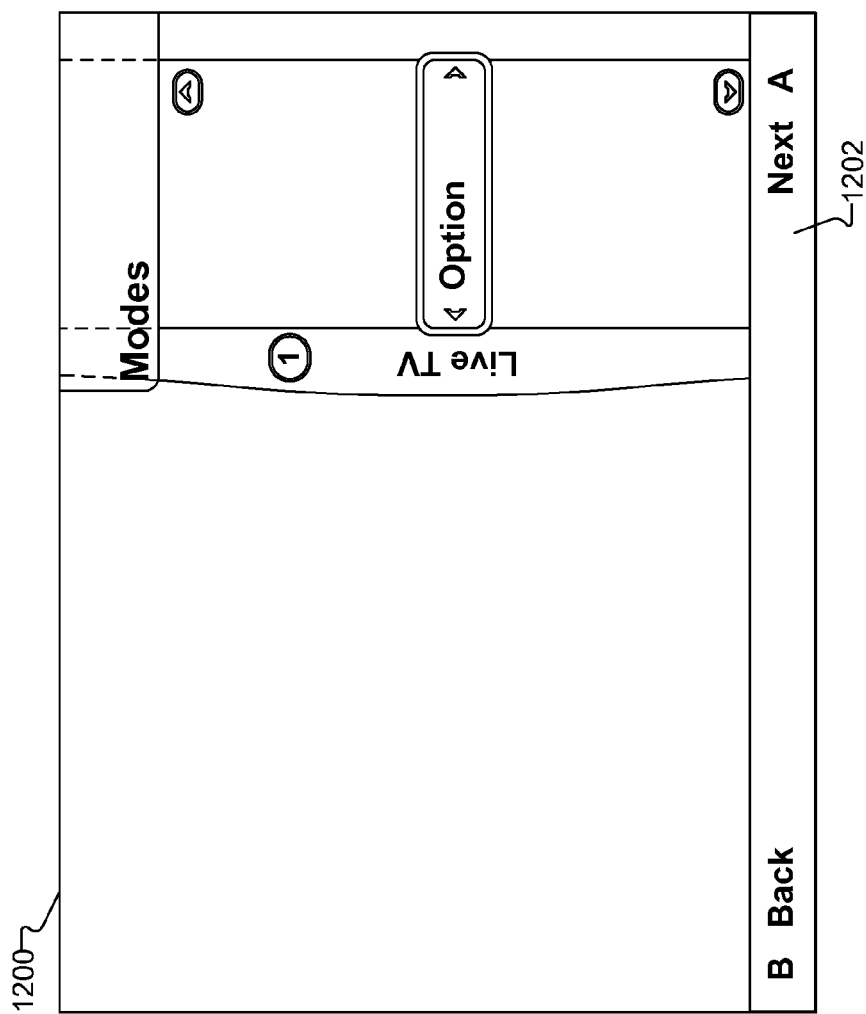

Accordingly, a building block placeholder element may be used in a GUI screen design to facilitate automatic generation and export of computing code that may be customized in accordance with requirements and/or style guides of different computing platforms such that the computing code is configured to be processed by computing devices having different computing platforms to render GUI screens that are customized for the different computing platforms. For example, FIG. 11 illustrates an exemplary GUI screen 1100 that may be rendered by a computing device of a first computing platform processing computing code generated and exported by export subsystem 104. As shown, GUI screen 1100 may include a footer graphical element 1102 customized to the first computing platform (e.g., footer graphical element 1102 includes left and right arrows depicting the inputs to be used for navigation backward and forward within a GUI rendered by the first computing platform). For comparison, FIG. 12 illustrates an exemplary GUI screen 1200 that may be rendered by a computing device of a second computing platform processing computing code generated and exported by export subsystem 104. As shown, GUI screen 1200 may include a footer graphical element 1202 customized to the computing platform (e.g., footer graphical element 1202 includes "A" and "B" indicators depicting the input buttons to be used for navigation backward and forward within a GUI rendered by the second computing platform).

In certain embodiments, one or more of the components (e.g., export subsystem 104 and/or other components of system 100) and/or processes described herein may be implemented and/or performed by one or more appropriately configured computing devices. To this end, one or more of the systems and/or components described above may include or be implemented by any computer hardware and/or computer-implemented instructions (e.g., software), or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

One or more of the processes described herein may be implemented at least in part as instructions executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Figure 13:
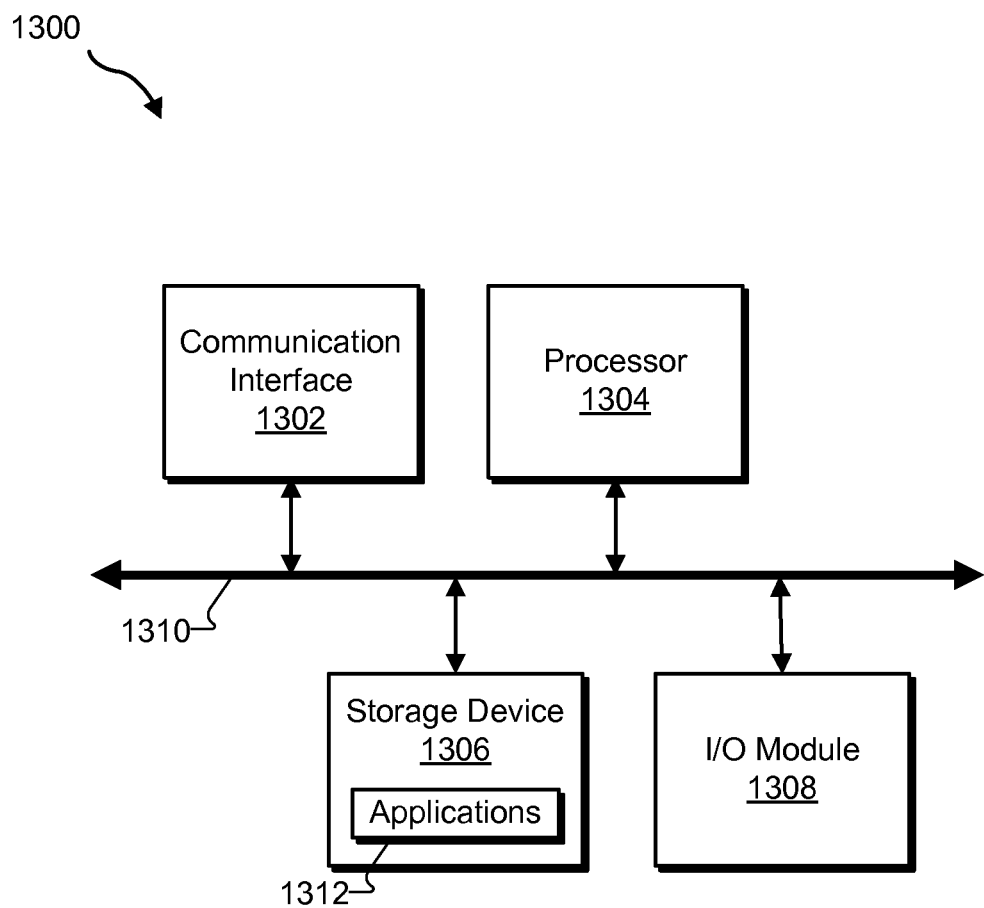
FIG. 13 illustrates an exemplary computing device according to principles described herein.

FIG. 13 illustrates an exemplary computing device 1300 configured to perform one or more of the processes described herein. In certain embodiments, computing device 1300 may implement export subsystem 104 and/or one or more other components of system 100. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, and any other suitable interface. Communication interface 1302 may additionally or alternatively provide such a connection through, for example, a local area network (such as an Ethernet network), a personal area network, a telephone or cable network, a satellite data connection, a dedicated URL, or any other suitable connection. Communication interface 1302 may be configured to interface with any suitable communication media, protocols, and formats, including any of those mentioned above.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1308 is configured to provide graphical data to a display for presentation to a user. The graphical data may be representative of one or more GUIs and/or any other graphical content as may serve a particular implementation.

In certain implementations, one or more subsystems 102-104 and/or one or more facilities of one or more of subsystems 102-104 may be implemented by computing device 1300. For example, applications 1312 may be configured to direct processor 1304 to perform one or more operations of design subsystem 102, export subsystem 104, distribution subsystem 106, interface facility 602, exporter facility 604, interface facility 702, and/or data management facility 704. Additionally or alternatively, storage facility 606 and/or storage facility 706 may be implemented on storage device 1306.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    interfacing, by a graphics export subsystem, with a graphics design subsystem to access data representative of a graphical user interface screen design, the graphical user interface screen design including a building block placeholder element having an identifier associated with the building block placeholder element;
    detecting, by the graphics export subsystem, the building block placeholder element in the graphical user interface screen design;
    accessing, by the graphics export subsystem from a repository of building block elements, data representative of a building block element associated with the building block placeholder element by querying the repository of building block elements to identify, based on the identifier associated with the building block placeholder element and an identifier associated with the building block element, the building block element;
    generating, by the graphics export subsystem based on the graphical user interface screen design and the building block element, computing code configured to be processed by a target computing device to render a graphical user interface screen in accordance with the graphical user interface screen design and the building block element;
    accessing, by the graphics export subsystem from the repository of building block elements, data representative of an additional building block element associated with the building block placeholder element by querying the repository of building block elements to identify, based on the identifier associated with the building block placeholder element and an identifier associated with the additional building block element, the additional building block element; and
    generating, by the graphics export subsystem based on the graphical user interface screen design and the additional building block element, additional computing code configured to be processed by an additional target computing device to render an additional graphical user interface screen in accordance with the graphical user interface screen design and the additional building block element;
    wherein the building block element, the target computing device, and the graphical user interface screen are associated with a computing platform; and the additional building block element, the additional target computing device, and the additional graphical user interface screen are associated with a different computing platform.

2. The method of claim 1, wherein:

the building block element is customized for the computing platform; and the additional building block element is customized for the different computing platform.

3. The method of claim 1, wherein the identifying of the building block element is further based on a computing platform identifier associated with the building block element.

4. The method of claim 1, embodied as computer-executable instructions on at least one non-transitory computer-readable medium.

5. A method comprising:

interfacing, by a graphics export subsystem, with a graphics design subsystem to access data representative of a building block graphical element design, the data representative of the building block graphical element design including data representative of an identifier associated with the building block graphical element design;

automatically generating, by the graphics export subsystem, a building block element based on the building block graphical element design, the building block element including data representative of an identifier associated with the building block element and based on the identifier associated with the building block graphical element design;

automatically generating, by the graphics export subsystem, a building block placeholder element associated with the building block element, the building block placeholder element including data representative of an identifier associated with the building block placeholder element and based on the identifier associated with the building block graphical element design; and exporting, by the graphics export subsystem, the building block element and the building block placeholder element for storage in a repository of building block elements, wherein the building block element is accessible by the graphics export subsystem for use in an automatic generation of graphical user interface screen computing code configured to be processed by a target computing device to render a graphical user interface screen in accordance with a graphical user interface screen design.

6. The method of claim 5, wherein the automatically generating of the building block element comprises generating and designating building block computing code and one or more graphical elements as the building block element.

7. The method of claim 5, further comprising:

interfacing, by the graphics export subsystem, with the graphics design subsystem to access data representative of an additional building block graphical element design, the data representative of the additional building block graphical element design including data representative of an identifier associated with the additional building block graphical element design;

automatically generating, by the graphics export subsystem, an additional building block element based on the additional building block graphical element design, the additional building block element including data representative of an identifier associated with the additional building block element and based on the identifier associated with the additional building block graphical element design; and exporting, by the graphics export subsystem, the additional building block element for storage in the repository of building block elements, wherein the additional building block element is accessible by the graphics export subsystem for use in an automatic generation of additional graphical user interface screen computing code configured to be processed by a different target computing device to render an additional graphical user interface screen in accordance with the graphical user interface screen design.

8. The method of claim 5, wherein:

the building block element, the graphical user interface screen computing code, and the target computing device are associated with a computing platform; and the additional building block element, the additional graphical user interface screen computing code, and the additional target computing device are associated with a different computing platform.

9. The method of claim 5, further comprising:

interfacing, by the graphics export subsystem, with the graphics design subsystem to access data representative of the graphical user interface screen design;

detecting, by the graphics export subsystem, the building block placeholder element in the graphical user interface screen design;

accessing, by the graphics export subsystem from the repository of building block elements, data representative of the building block element associated with the building block placeholder element by querying the repository of building block elements to identify, based on the identifier associated with the building block placeholder element and the identifier associated with the building block element, the building block element; and generating, by the graphics export subsystem based on the graphical user interface screen design and the building block element, the graphical user interface screen computing code configured to be processed by the target computing device to render the graphical user interface screen in accordance with the graphical user interface screen design and the building block element.

10. The method of claim 5, embodied as computer-executable instructions on at least one non-transitory computer-readable medium.

11. A system comprising:

at least one computing device comprising:

an interface facility that interfaces with a graphics design subsystem to access data representative of a graphical user interface screen design, the graphical user interface screen design including a building block placeholder element having an identifier associated with the building block placeholder element; and an exporter facility communicatively coupled to the interface facility that detects the building block placeholder element in the graphical user interface screen design, accesses, from a repository of building block elements, data representative of a building block element associated with the building block placeholder element by querying the repository of building block elements to identify, based on the identifier associated with the building block placeholder element and an identifier associated with the building block element, the building block element, generates, based on the graphical user interface screen design and the building block element, computing code configured to be processed by a target computing device to render a graphical user interface screen in accordance with the graphical user interface screen design and the building block element, accesses, from the repository of building block elements, data representative of an additional building block element associated with the building block placeholder element by querying the repository of building block elements to identify, based on the identifier associated with the building block placeholder element and an identifier associated with the additional building block element, the additional building block element, and generates, based on the graphical user interface screen design and the additional building block element, additional computing code configured to be processed by an additional target computing device to render an additional graphical user interface screen in accordance with the graphical user interface screen design and the additional building block element, wherein:
the building block element, the target computing device, and the graphical user interface screen are associated with a computing platform; and
the additional building block element, the additional target computing device, and the additional graphical user interface screen are associated with a different computing platform.

12. The system of claim 11, wherein:
the building block element is customized for the computing platform; and
the additional building block element is customized for the different computing platform.

13. The system of claim 11, wherein the exporter facility identifies the building block element based further on a computing platform identifier associated with the building block element.

14. The method of claim 1, wherein the building block placeholder element is configured to indicate that the graphics export subsystem is to access, from the repository of building block elements, data representative of one or more building block elements associated with the building block placeholder element for use in generating the computing code.

15. The method of claim 1, wherein the building block placeholder element in the graphical user interface screen design is a graphical placeholder for one or more building block elements stored in the repository of building block elements.

16. The method of claim 1, wherein the building block placeholder element is not associated with any computing platform.

17. The method of claim 1, wherein the graphics design subsystem includes an interactive user interface configured to facilitate a user definition and modification of the graphical user interface screen design.

18. The method of claim 1, wherein the building block element includes data representative of at least a portion of the computing code configured to be processed by the target computing device to render the graphical user interface screen.

19. The method of claim 5, wherein the building block element is accessible by the graphics export subsystem from the repository based on the identifier associated with the building block element.

* * * * *